Oct. 22, 1963  D. K. McLEAN  3,107,380
PIPELINE ACCESS JOINT ASSEMBLY
Filed April 21, 1960  2 Sheets-Sheet 1
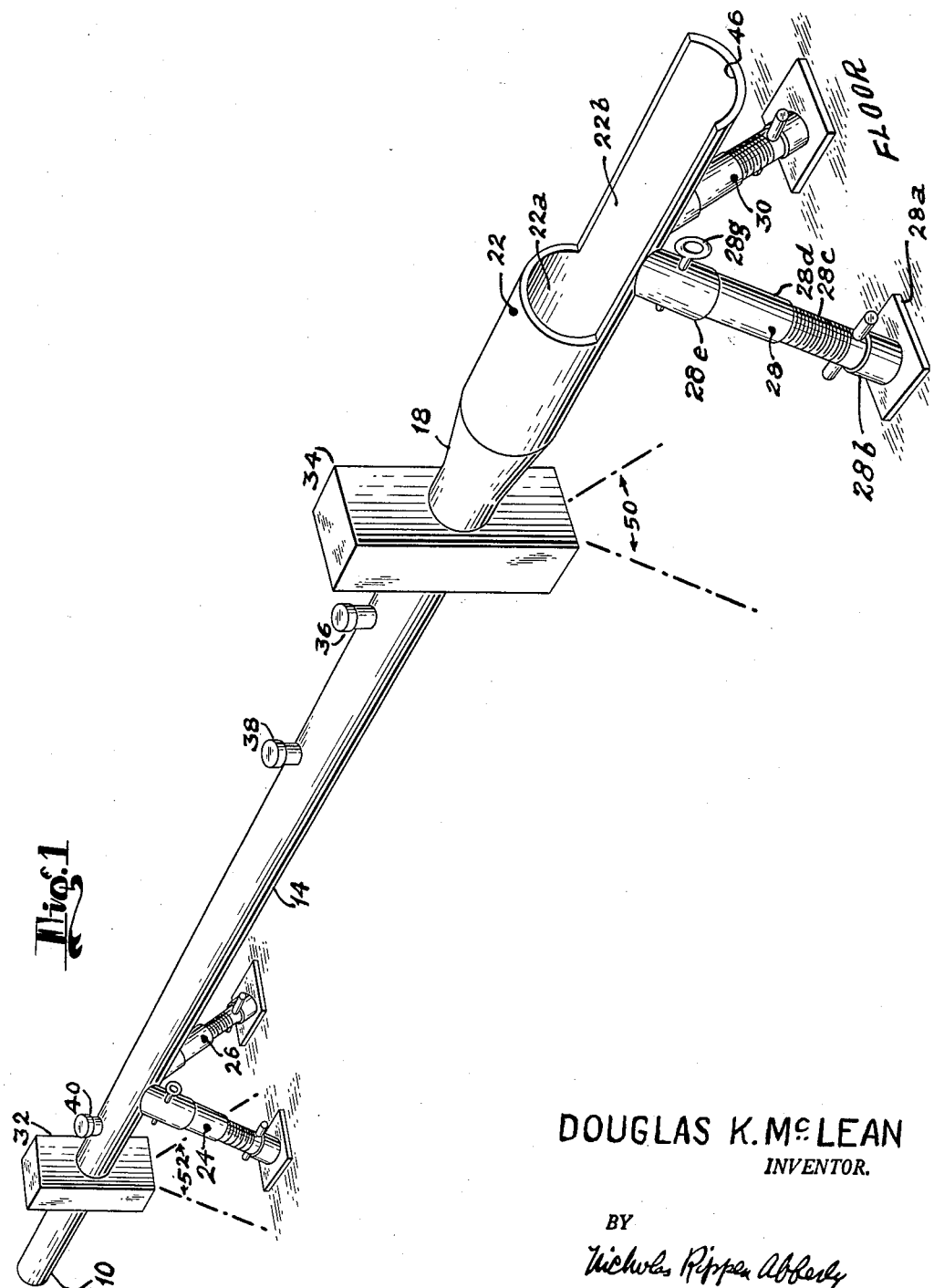
DOUGLAS K. McLEAN
INVENTOR.
BY
*Nicholas Pippen Abberly*
REG. PATENT AGENT

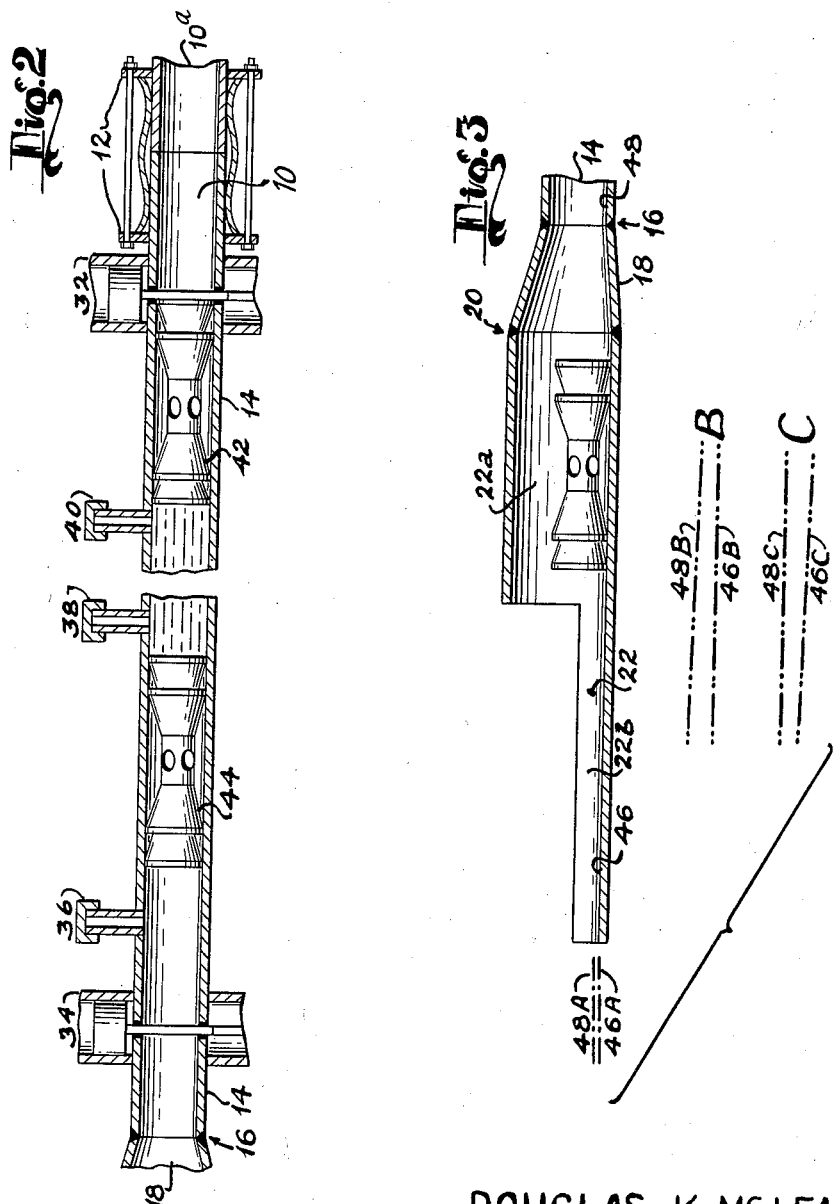

United States Patent Office 3,107,380
Patented Oct. 22, 1963

3,107,380
PIPELINE ACCESS JOINT ASSEMBLY
Douglas K. McLean, Dallas, Tex., assignor to Harvest Queen Mill & Elevator Company, Dallas, Tex., a corporation of Texas
Filed Apr. 21, 1960, Ser. No. 23,670
4 Claims. (Cl. 15—104.06)

This invention relates to pipeline coating and treating operations and more particularly to an access joint assembly which is adapted detachably to be mounted at the end of a pipeline for loading and unloading pipeline servicing apparatus into and from a pipeline.

The present invention is particularly useful in operations in which an apparatus for treating the inside of a pipeline is to be moved through a pipeline under differential pneumatic pressures. Preset pressures are maintained at opposite faces of the apparatus in order that the apparatus will move through the pipeline at a predetermined speed. In systems of the type illustrated in the patent to Curtis et al., No. 2,480,358, entitled Apparatus for Coating the Interior of Pipelines, a pair of coating plugs are spaced apart one from the other. A fluid pipeline treating medium is disposed between the two plugs. As the plugs are moved through the pipeline, the treating medium is maintained in contact with the inside surface of the pipe by reason of the differential pressures on the two plugs so that the pipeline is cleaned, coated or otherwise treated with the treating medium confined between the plugs.

In Patent No. 2,663,326 to Curtis entitled End Closure for Pup Joints Used in Coating the Interior of Pipelines, there is disclosed a novel end closure which permits the insertion into and extraction from a pipeline of servicing apparatus of various types. Such closure means permits operations which are safer than otherwise inherent in such operations.

The present invention relates to an improvement over such systems as above described, particularly in providing for greater convenience and economy while maintaining and enhancing the safety to operating personnel.

More particularly, in accordance with the present invention there is provided an access joint assembly for facilitating insertion of a pipeline servicing unit into an end of the pipeline. The assembly includes a tubular member adapted at one end to be connected to the end of the pipeline with the tubular member being of hollow cylindrical configuration at the end adjacent the pipeline. At the end of the assembly opposite the pipeline, a tubular member has a semi-cylindrical configuration providing an upfacing tray to receive and support the pipeline servicing unit preparatory to insertion into the pipeline. Support means are then provided for maintaining the end of the assembly opposite the pipeline in a predetermined orientation with respect to the pipeline. In a preferred embodiment of the invention, the assembly has a tapered or conical coupling section between the portion thereof of hollow, cylindrical configuration and the tray section.

In accordance with a further aspect of the invention, the access joint assembly includes a tubular member open at one end for connection to the end of the pipeline. A tray section is provided with the tubular member having a central section extending from the pipeline end to the tray section. A pair of valve members are positioned at spaced points on the central section. A guide element serves to couple the tray section to the central section. A plurality of ports are provided at spaced points along the central section and including a venting port adjacent the valve at the pipeline end, a loading port intermediate the ends of the central section and a supply port adjacent the valve at the tray end of the central section. Means are then provided for variably positioning the assembly for alignment with the end of the pipeline.

For a more complete understanding of the present invention and for further objects and advantages thereof, reference may now be had to the following description taken in conjunction with the accompanying drawings in which:

FIG. 1 is a perspective view of a system incorporating the invention;

FIG. 2 is a sectional view of a portion of the access joint assembly; and

FIG. 3 is a sectional view of one end section of the access joint assembly.

Referring now to FIG. 1, there is illustrated an elongated assembly which includes an end section 10 coupled by way of a valve 32 to an intermediate loading section 14. The section 14 is connected by way of a valve assembly 34 to a tray member 22. A conical section 18 is positioned intermediate the tray section 22 and the valve 34. The tray section 22 is characterized by being of cylindrical configuration in the portion 22a closest to the valve 34 and semicylindrical configuration in the section 22b. The section 22b thus forms an upfacing tray. A pair of adjustable legs 28 and 30 are provided for the support of the section 22. In a similar manner a pair of adjustable legs 24 and 26 are provided to support the pipeline end of the system. The legs 24 and 26 are fastened to the loading section 14 at a point adjacent to the lead valve assembly 32. If desired, similar supports may be provided for the valve assembly 32 as indicated by the dashed lines 52 and for the valve assembly 34 as indicated by the dashed lines 50.

In practice, the loading section 14 and the end section 10 are formed from material of the same diameter and preferably the same wall thickness as the pipeline to which the assembly is to be connected. As indicated in FIG. 2, the end section 10 is connected to a pipeline 10a by means of a sleeve 12. The sleeve 12 is of well-known construction and widely used in the pipeline art and provides a pressure-tight seal between the ends of the section 10 and the end of the pipeline 10a. Such sleeves are manufactured and sold by Dresser Industries, Inc. of Dallas, Texas.

A pipeline treating system comprising plugs 42 and 44 of FIG. 2 is to be inserted into the pipeline for treating operations. Often such units as the plugs 42 and 44 are of tremendous weight and are difficult to handle. They may weigh as much as 600 pounds or more and thus the initial placement of the plugs in position to initiate pipeline servicing operations presents a substantial problem. In accordance with the present invention, the access joint assembly provides the tray section 22b with the upfacing surface 46 on which each of the plugs 42 and 44 may initially be placed. The valve assembly 34 is then opened and a given plug is mechanically forced into the loading section 14.

Fluid pressure supply port 36, servicing treatment material loading port 38, and pressure vent port 40 are provided in the loading section 14. The ports 36 and 40 are adjacent to the valve assemblies 34 and 32, respectively. Thus, with valve 34 open and valve 32 closed, a given plug 42, shown in FIG. 2, is forced into loading section 14. The plug is first positioned slightly beyond the fluid pressure supply port 36. In this position the valve 34 is then closed and vent port 40 is opened. The application of air pressure to port 36 will then serve to move the first plug 42, FIG. 2, to a point forwardly of the port 40, the air then escaping via port 40. As illustrated in FIG. 2, the plug 42 is moved beyond the port 40 by fluid pressure and adjacent to the valve 32. Upon completion of this operation, the valve 34 is again opened and a second plug is placed in the tray portion 22b and then moved into the loading section 14. The second plug, such as plug 44, FIG. 2, is then manually moved to the position illustrated in FIG. 2, that is, between the ports 36 and 38 by use of a loading rod by means of which the position of the plug 44 may be gauged to make certain that it does not obstruct port 38. Once positioned, the valve 34 and port 40 are closed. A suitable treating material for the pipeline 10a is then introduced into the loading section between the plugs 42 and 44 by way of the port 38. When sufficient treating material is loaded into the loading section 14 between the plugs 42 and 44, the port 38 is closed and air or gas pressure is then applied to the trailing face of the plug 44 by way of port 36. Valve 32 is then opened and the assembly of plugs 42 and 44 and the treating material maintained between them is then moved through the pipeline by fluid pressure entering from port 36. The plugs 42 and 44 wipe or spread the treating material uniformly over the inner surface of the pipeline 10a.

Ordinarily a pressure differential is maintained across the treating assembly. That is, the pressure on the trailing face of the plug 44 will exceed substantially a back pressure maintained on the forward face of the plug 42 so that the velocity with which the treating units move through the pipeline is controlled.

It will be recognized that since the treating units provide for a wiping action on the inside wall of the pipeline that the cup-shaped portions thereof are designed to maintain contact with the wall and yet permit their movement through the pipeline. This, of course, presents a problem in that the treating units, such as plugs 42 and 44, must be initially forced into the pipeline. This is accommodated and facilitated in accordance with the present invention by providing the tray section 22b, the cylindrical section 22a and the conical section 18 of the access joint. The tray 22b and the cylindrical section 22a are of larger diameter than the pipeline 10a to permit initial positioning and movement of a given plug into alignment with the loading section 14. The conical section 18 provides a gradual taper from the larger diameter of the section 22a down to the diameter of the section 14 so that a given plug may be propelled with initial mechanically applied momentum along the length of the tray section 22b and into the loading section 14.

It will be further recognized that manipulation of the access joint assembly of FIG. 1 and the servicing units 42 and 44 is at best a cumbersome operation. It is therefore highly desirable that an accurate alignment be maintained between the pipeline 10a and the access joint assembly. For this reason the supporting legs on the assembly have been made adjustable. The legs may each include a tubular member such as member 28e welded to the bottom surface of the given portion of the access joint assembly. The cylindrical cups thus welded to the outer walls are angled outwardly one from the other and are symmetrical with respect to the axes of the ports 36, 38 and 40. The legs further include an outer sleeve 28d which is inserted into the cup portion 28e and secured by pin 28g. A section 28c then threadedly engages the inside of the tubular section 28d and is thus adjustable by means of the screw connection. The lower end of the threaded section 28c is fitted into a cup 28b which is mounted on a floor plate 28a. Each of the leg structures 24, 26, 28 and 30 has the features above-described in connection with the leg 28a so that the access joint may be initially positioned adjacent to the end of the pipeline 10a and then individual adjustments may be made in the attitude and height of the legs 24, 26, 28 and 30 so that the access joint assembly may be readily and accurately aligned with the pipeline 10a.

As illustrated in FIG. 3, the conical section 18 is connected as by welding at points 16 and 20 to the loading section 14 and the cylindrical section 22a. Section 18 may have a bottom surface which is in alignment with the bottom surface of the loading section 14. However, as in FIG. 3 at B, it may slope slightly downward from the loading section 14. A parallel alignment with the floor section 48 of the loading member 14 is indicated by the lines 48a and 46a. The surfaces may, however, be slightly angled one with respect to the other as indicated by the lines 46b, 48b or 46c and 48c. In the case of lines 46b and 48b planes of the floor sections 46 and 48, respectively, would intersect inside the pipeline. In the case of lines 46c and 48c, illustrated in FIG. 3 at C, the planes of the floor sections 46 and 48 would intersect outside or the left end of the pipeline.

It will be appreciated that the differences in diameter as between the section 22 and the loading section 14 have been somewhat amplified for emphasis. In actual practice the difference between the dimensions need be only such that the plugs 42 and 44 will move freely through the cylindrical section 22a while they maintain circumferential contact with the walls of the loading section 14. It will be appreciated that where the treating plugs each weigh hundreds of pounds, it would be desirable to provide supports in addition to the legs 24, 26, 28, 30, particularly at locations immediately under the valves 32 and 34 in order to relieve them of undue stress as the treating plugs pass therethrough.

While the loading tray section of the access joint assembly has been illustrated as formed from a unitary cylinder, the portion 22a thereof being formed merely by slicing a pipe at or below a horizontal axial plane, it will be recognized that other configurations may be found suitable so long as a loading surface or tray, together with a supporting guideway into the loading section 14, is provided. The covered loading section 22a, however, is preferred in that it provides for protection to personnel and provides a positive guide for the plug into the valve structure 34.

Having described the invention in connection with certain specific embodiments thereof, it is to be understood that further modifications may now suggest themselves to those skilled in the art and it is intended to cover such modifications as fall within the scope of the appended claims.

What is claimed is:

1. An access joint assembly for facilitating insertion of a pipeline servicing unit into the end of a pipeline which comprises a tubular loading member open at one end for connection to said end of said pipeline, a tray section at the other end of said tubular member, said tubular member having a section extending from said one end to a point near said tray section at the other end, a pair of valve members positioned at spaced apart points along said last named section one adjacent said one end and the other adjacent said other end, guide means coupling said tray section to said last named section, a loading port intermediate the length of said last named section, and a fluid pressure supply port in said last named section adjacent to the valve member adjacent said other end, and support means for positioning said assembly in alignment with the end of said pipeline.

2. An access joint assembly according to claim 1 wherein at least a portion of said tray section is of an upfacing semi-cylindrical configuration larger in diameter than the diameter of said last named section, and said guide means is of a configuration tapered from said tray diameter to said last named section diameter.

3. An access joint assembly according to claim 1 which further includes a venting port in said last named section adjacent to the valve member adjacent to said one end.

4. An access joint assembly according to claim 3 wherein at least a portion of said tray section is of an upfacing semi-cylindrical configuration larger in diameter than the diameter of said last named section, and said guide means is of a configuration tapered from said tray diameter to said last named section diameter.

References Cited in the file of this patent

UNITED STATES PATENTS

| | | |
|---|---|---|
| 539,797 | Collins | May 28, 1895 |
| 906,595 | Whitney | Dec. 15, 1908 |
| 2,480,358 | Curtis et al. | Aug. 30, 1949 |
| 2,623,226 | Jones et al. | Dec. 30, 1952 |
| 2,705,419 | Chawner | Apr. 5, 1955 |
| 2,796,878 | Atkinson et al. | June 25, 1957 |
| 2,804,147 | Pistole et al. | Aug. 27, 1957 |
| 2,929,410 | Morrison | Mar. 22, 1960 |